United States Patent [19]

Blace

[11] 4,051,033
[45] Sept. 27, 1977

[54] FILTER DEVICE

[75] Inventor: Roy J. Blace, Wallingford, Conn.

[73] Assignee: Blace Filtronics, Inc., Derby, Conn.

[21] Appl. No.: 643,594

[22] Filed: Dec. 22, 1975

[51] Int. Cl.² ............................................. B01D 23/04
[52] U.S. Cl. ................................ 210/193; 210/333 R; 210/483
[58] Field of Search ................... 55/379; 210/75, 82, 210/193, 315, 317, 323 T, 333 R, 356, 411, 484, 485, 483

[56] References Cited

U.S. PATENT DOCUMENTS

| 2,891,673 | 6/1959 | Zievers | 210/484 X |
| 3,149,072 | 9/1964 | Silverman | 210/323 T |
| 3,168,469 | 2/1965 | Abdalian et al. | 210/75 X |
| 3,285,420 | 11/1966 | Muller | 210/333 R |
| 3,438,502 | 4/1969 | Schmidt et al. | 210/333 R |
| 3,535,852 | 10/1970 | Hirs | 55/379 X |
| 3,622,001 | 11/1971 | Oden | 210/333 |
| 3,779,386 | 12/1973 | Ryan | 210/193 |
| 3,954,618 | 5/1976 | Strauss | 210/323 T |

FOREIGN PATENT DOCUMENTS

| 1,461,460 | 2/1971 | Germany | 210/323 T |
| 105,943 | 8/1923 | Switzerland | 210/323 T |
| 903,248 | 8/1962 | United Kingdom | 210/413 |
| 6,987 | 7/1889 | United Kingdom | 210/323 T |

Primary Examiner—Theodore A. Granger

Attorney, Agent, or Firm—McCormick, Paulding & Huber

[57] ABSTRACT

A diatomite filter device for cleansing fluid carrying particulate matter in the micron size range comprises a filter housing having top and bottom plates and a manifold beneath the latter. A supply conduit communicates with the manifold and with a valve-controlled diatomite reservoir. Flexible tubular filter bags in the housing have inlet openings at the bottom and are mounted about flanges adjacent inlet openings in the housing bottom plate, the latter being in communication with the manifold for a supply of fluid. Each bag has an interior skeletal frame for preventing bag collapse during a backwash operation and an exterior wire mesh skeletal frame for preventing ballooning of the bag during the filter operation. The assemblies comprising a bag and its two associated skeletal frames are mounted at lower end portions about their flanges by means of clamping rings and, preferably, each flange has a horizontal flange at the top notched to receive lower end portions of the inner skeletal frame. The lower end portions of the bags and the exterior skeletal frames are bent inwardly beneath the horizontal flange and about the mounting flange. The wire mesh of the exterior frame is approximately one-quarter inch square, of stainless steel and, optionally, of epoxy-coated construction.

11 Claims, 10 Drawing Figures

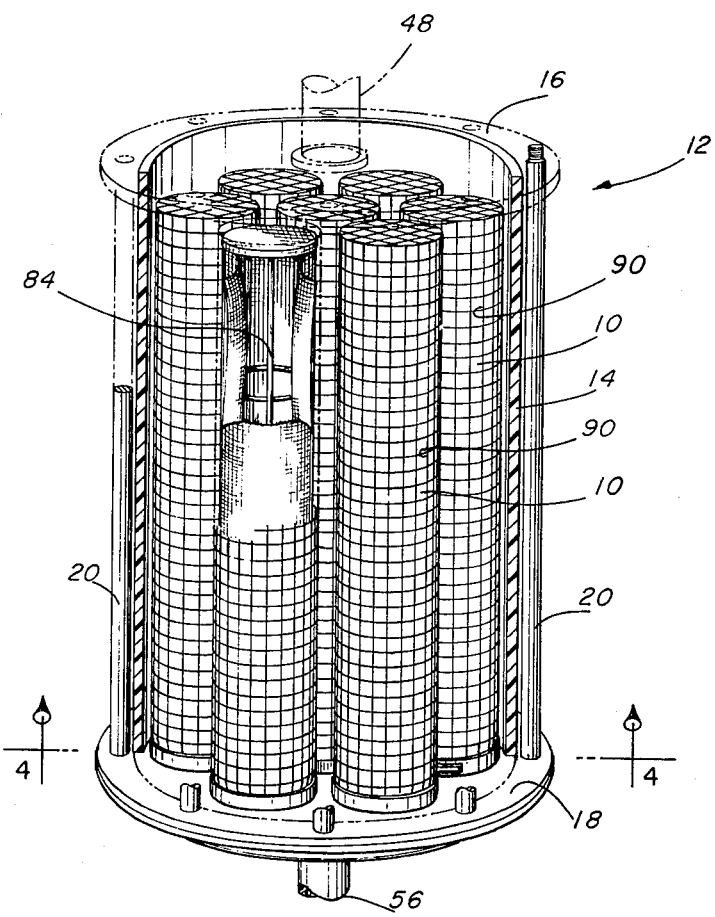
Fig. 1
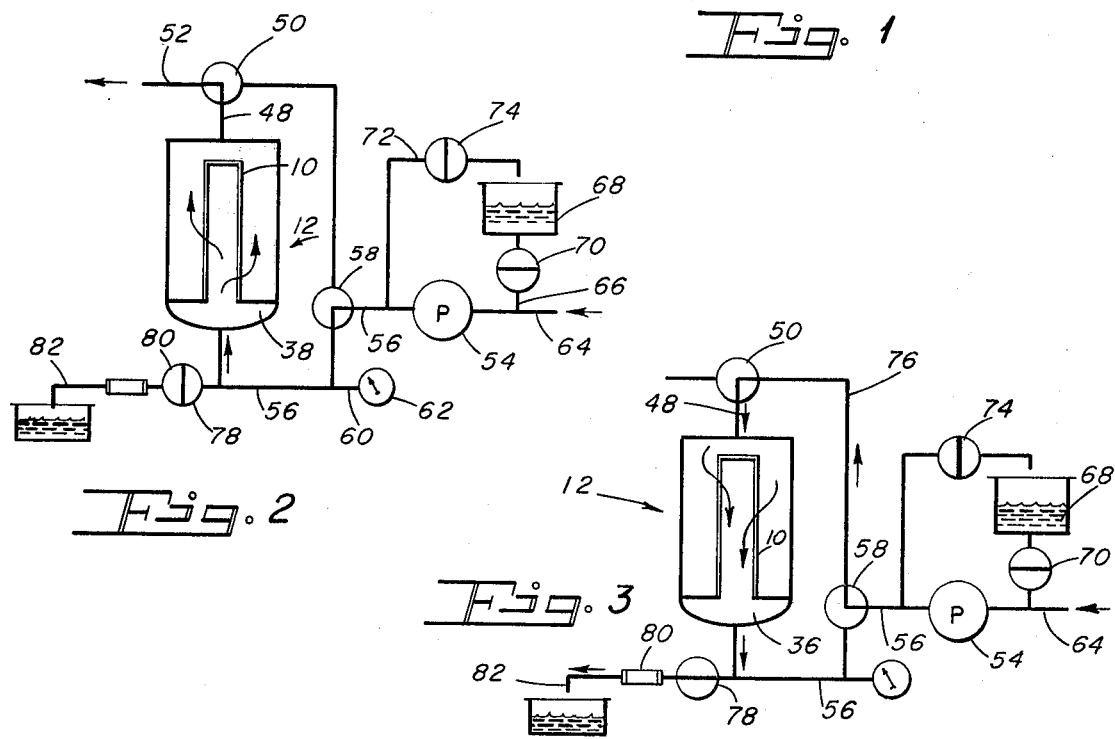
Fig. 2
Fig. 3

FILTER DEVICE

BACKGROUND OF THE INVENTION

Filter devices of the general type under consideration include filter bags coated internally with diatomite or the like and adapted for fluid flow outwardly therethrough in a filter operation. While such devices have proven generally satisfactory, certain disadvantages have been encountered in operation. More particularly, ballooning of the bags under internal pressure followed by contraction on pressure relief through enlarged filter openings, and once again followed by ballooning has been an undesirable characteristic of such devices. Intermittent ballooning the resulted in the passage of undesirably large particles through the filter openings in the bag and, when the bags are arranged in closely spaced relationship, serious abrasion wear of the bags has occurred as they engage each other during the ballooning phase. Still further, the mounting of filter bags and their supporting structure about inlet flanges has been undesirably complex and somewhat unwieldy in filter devices heretofor available.

SUMMARY OF THE PRESENT INVENTION

It is the general object of the present invention to provide a filter device of the type mentioned which includes a perforate external bag support means operable to prevent ballooning of the filter bags and which also includes an improved mounting means for the filter bags, the conventional internal bag support means, and the external bag support means of the present invention.

BRIEF DESCRIPTION OF THE DRAWINGS

FIG. 1 is a perspective view of a main portion of the filter device comprising a filter housing and filter bags therewithin with portions broken away for clarity of illustration.

FIG. 2 is a schematic illustration of the filter device with control elements therein adjusted for a filtering mode of operation.

FIG. 3 is a schematic illustration of the device with the control elements adjusted for a "backwash" or "flushing" mode of operation.

DESCRIPTION OF PREFERRED EMBODIMENT

Figure 4:
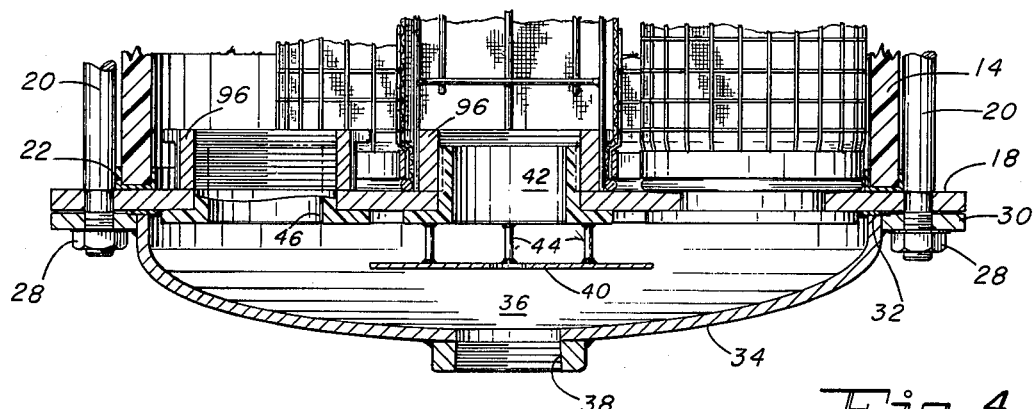
FIG. 4 is an enlarged fragmentary vertical section of a lower portion of the filter device showing a portion of a filter housing, a manifold, and filter bags, etc.

A filter device constructed in accordance with the present invention comprises at least one substantially upright generally tubular perforate filter bag of a flexible material and having an inlet opening at a lower end portion. As illustrated in FIG. 1, seven such filter bags are provided in the filter device shown and are identified by the reference numeral 10,10, six of the bags being spaced circumaxially about a centrally located bag within a housing indicated generally at 12. The filter housing 12 has a cylindrical side wall 14, preferably of fiberglass construction, and top and bottom plates 16,18 secured in assembled relationship with the side wall 14 by vertical tie rods 20,20. Tie rods 20,20 are arranged in circumaxially spaced relationship about the housing side wall 14 and vertically aligned openings for receiving opposite ends of the tie rods are provided respectively in the top and bottom plates 16,18. As best illustrated in FIG. 4 a small U-shaped annular seal 22 extends around the bottom edge of the housing side wall 14 and is clamped between the side wall and the lower end plate 18. Similarly, a U-shaped annular seal 24 is disposed between the top plate 16 and the side wall 14. At their upper end portions, the tie rods 20,20 have suitable nuts 26,26 threadably engaged for securing the housing in assembled relationship. Similarly, at lower end portions the tie rods 20,20 have threaded end portions engaged with nuts 28,28. The nuts 28,28 do not, however, bear against the bottom plate 18 but instead clamp an annular flange 30 in position subadjacent the lower plate 18 and with an annular seal 32 therebetween providing for watertight engagement.

The annular flange 30 is formed marginally on a manifold element 34 which is concave viewed downwardly and which is disposed beneath the bottom plate 18 to define a manifold 36. An inlet opening 38 is provided in the manifold element 34 and there is also preferably provided within the manifold 36 a horizontal baffle plate 40. The baffle plate 40 is disposed in spaced relationship beneath a central filter bag inlet opening 42 by means of small vertical space elements 44,44. The inlet opening 42 serves the forementioned centrally located filter bag 10 and six additional inlet openings 46,46 are provided respectively for the six circumaxially spaced bags 10,10.

From the foregoing, it will be apparent that particle bearing fluid may be introduced to the manifold inlet opening 34 from a suitable supply conduit and thence pass through the manifold 36 for uniform distribution to the several filter bag inlet openings 42 and 46,46. The fluid may then flow upwardly within the filter bags as illustrated schematically in FIG. 2, outwardly through the walls of the filter bags, into the housing and thence to discharge through an outlet conduit 48 at the top of the housing. A valve 50 receives the discharge fluid from the conduit 48 and directs the same to a discharge conduit 52. As further illustrated in FIG. 2, pressurization of fluid to be cleansed may be provided for by means of a suitable pump 54 discharging to a filter supply conduit 56. The filter supply conduit 56 extends to the manifold 34 through a manually operable control valve 58 and a short branch conduit 60 extends to an optional pressure gauge 62. An inlet conduit for the pump 64 has a branch conduit 66 leading thereto from a diatomite or other filter media supply means in the form of a reservoir 68. A manually adjustable valve 70 controls the flow of a diatomite bearing fluid to the conduit 64 and a branch conduit 72 provided with a manual outlet valve 74 leads from the supply conduit 56 and may be employed in supplying fluid to the diatomite reservoir 68.

In a "backwash" or "flushing" mode of operation, the valve 58 is manually adjusted to divert flow from the pump 54 and conduit 56 through a "backwash" or "flushing" conduit 76, the latter extending from the valve 58 to the aforementioned valve 50, FIG. 3. The valve 58 closes the supply conduit 56 to the manifold 36, and the valve 50 establishes communication between the backwash conduit 76 and the aforementioned discharge conduit 48, the latter thus being converted to an inlet conduit for the filter housing 12. With this arrangement, fluid flow occurs inwardly through the walls of the filter bags 10,10, diatomite is thus removed from the interior of the bags, and the flow continues through the manifold and is discharged through the final leg of the conduit 56, formerly a manifold inlet conduit. The valve 58 being closed to the pump 54 as mentioned, the backwash fluid is constrained to flow through a valve 78, now adjusted to an open condition, a sight glass 80 and thence to discharge at 82. Thus, a simple and effective backwash operation is achieved with the proper adjustment of the three valves 50, 58 and 78. When the several valves are in the positions shown in FIG. 2, a filtering mode of operation is provided for as indicated. It should also be noted, however, that the valves 70 and 74 may be opened and a "pre-coat" operation will result with diatomite supplied to the interior of the filter bags for the uniform coating thereof.

Figures 5, 6:
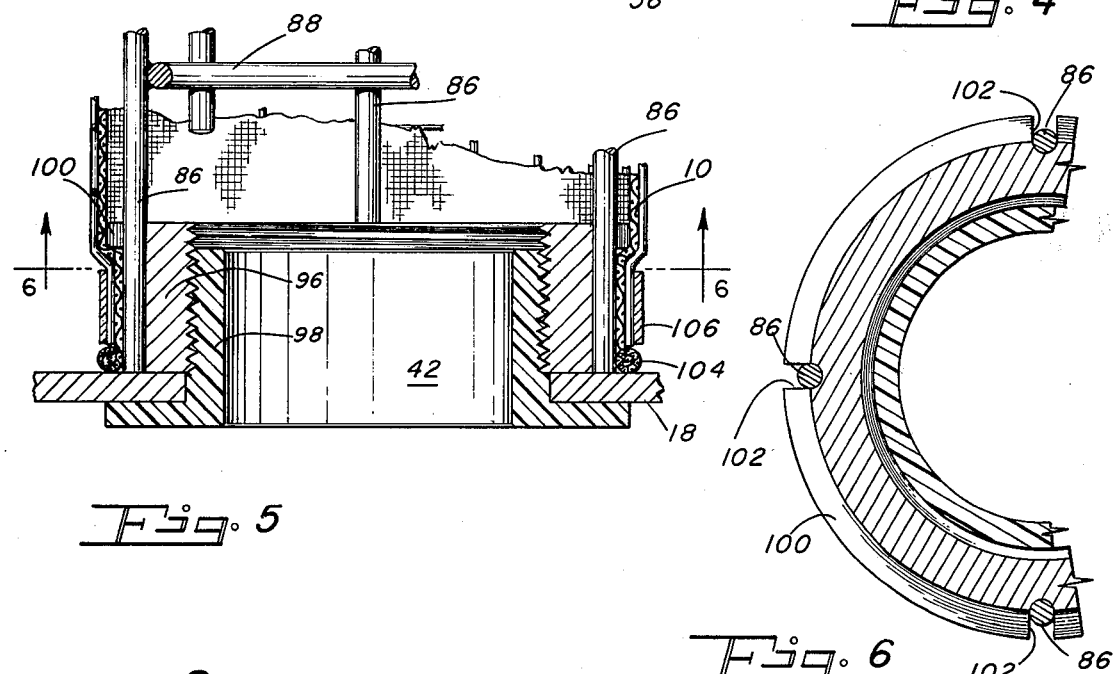
FIG. 5 is a further enlarged fragmentary vertical section showing a portion of a single inlet opening, an inlet flange, and lower end portions of a filter bag and associated internal and external support means.
FIG. 6 is a fragmentary horizontal section taken generally as indicated at 6—6 in FIG. 5 and illustrating details of a mounting flange at an inlet opening.

Reverting now to FIG. 1, it will be observed that the bags 10,10 are each provided with internal and external perforate support means. A portion of an internal bag support means 84 is illustrated in the filter bag 10 which is broken away at an upper portion and it will be understood that each of the bags 10,10 has an associated internal support means of identical construction. The internal support means are or may be conventional and serve to support the filter bags and to prevent the collapse thereof during the aforementioned backwash or flushing mode of operation of the filter device. The support means may vary widely in construction but preferably taken the form of upright tubular skeletal frames of welded metallic rod construction and which may be epoxy-coated. As best illustrated in FIGS. 4 and 5, a plurality of vertical frame members or rods 86,86 extend beneath a lower-most annular member or rod 88 of the skeletal frame 84 and the said members are employed in mounting the frame and its associated bag in assembled positions as described hereinbelow.

The filter bags 10,10 may also vary in construction but are preferably of a woven polypropylene and when properly coated with diatomite in a uniform manner are capable of filtering out particles in the micron size range. That is, particles as small as 5 microns have been filtered out of fluid with the woven polypropylene bags of the present invention absent the provision of the exterior bag support means to be described hereinbelow. With an identical woven polypropylene bag but including the exterior bag support means of the present invention, it has been possible to filter out particles as small as 0.45 microns.

Each perforate exterior bag support means of the present invention preferably takes the form of an upright tubular skeletal frame 90 and, more particularly, a frame of metallic wire mesh having small rectangular openings. The size of the openings in the wire mesh is judiciously selected so as not to pressurize or otherwise to interfere with an outward fluid flow through the associated filter bag and yet effectively to prevent ballooning of the bag. Accordingly, the aforementioned detrimental effects of ballooning including particle escape and interbag abrasion are avoided and yet no interference is encountered with the normal filtering operation. Highly efficient filtering is thus achieved with smaller particle sizes and with higher filter pressures being readily accommodated.

It is presently preferred that the frames 90,90 be of stainless steel, wire mesh construction as indicated, that epoxy coating be employed for special applications, and that the small rectangular openings therein have a maximum dimension no greater than 2 inches. The mesh shown has openings of approximately one-quarter inch square and highly efficient operation has been achieved therewith.

Figures 7, 8, 9, 10:
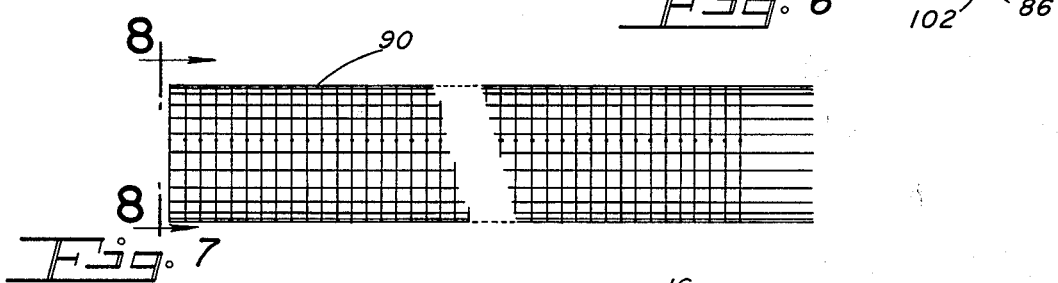
FIG. 7 is a side view of an external filter bag support means constructed in accordance with the present invention.
FIG. 8 is a top view of the external bag support means taken generally as indicated at 8 in FIG. 7.
FIG. 9 is a fragmentary vertical section taken at an upper end portion of the filter device and showing an alternative embodiment of an external bag support means constructed in accordance with the present invention.
FIG. 10 is a horizontal section taken generally as indicated at 10—10 in FIG. 9.

The shape of the external support frame is tubular as indicated with the frames open at the bottom and closed at the top, FIGS. 1, 7 and 8. In an alternative embodiment of the present invention shown in FIGS. 9 and 10, an external support means or frame 90a extends from the bottom plate 18 of the filter housing to the top plate 16 thereof and is formed initially as a tube open at each end, thus providing for efficient and inexpensive construction. Thereafter, a separate circular top member 92 is inserted within the tube a short distance from the top thereof and the said member is secured in place adjacent the top of the associated filter bag 10 by means of an appropriate cross wire 94 inter-engaging the main tube member 90a.

Further in accord with the present invention, each of the inlet openings 42 and 46,46 is provided with an adjacent upstanding mounting flange 96, FIGS. 4 and 5. Each flange 96 has an associated flanged sleeve 98 which is entered upwardly from beneath the bottom plate 18 and which has external threads engaging with internal threads on the flange 96. Thus, the sleeve 98 can be secured in position to lock its associated flange 96 in position as illustrated. At an upper end portion each of the flanges 96 is preferably also provided with an integral narrow outwardly projecting horizontal flange 100, best illustrated in FIGS. 5 and 6. Each flange 100 has a series of outwardly open notches 102,102 provided therein and which are circumaxially spaced thereabout, four such notches preferably being provided in the embodiment of the invention shown. The circumaxial spacing of the notches 102,102 is similar to the circumaxial spacing of the aforementioned vertical members 86,86 at a lower end portion of the internal skeletal frame 84. Thus, the members 86,86 may be entered in the notches 102 as best illustrated in FIG. 6 so as to extend beneath the flange 100 and to engage and rest upon the bottom plate 18 of the filter housing.

Returning to FIG. 5, it will be observed that a filter bag 10 shown therein is disposed about the vertical members 86,86 and the flange 100 and extends to a lower end portion where it is rolled upon itself and secured at 104. Similarly, a lower end portion of the external skeletal frame or mesh member 90 extends downwardly beyond the flange 100 and about the bag 10. As best illustrated in FIG. 7, the horizontal rings are eliminated at the lower end portion of the frame 90 so as not to interfere with the mounting and assembly of the frame about the inlet or mounting flange 96. As further shown in FIG. 7, individual members at the lower end portion of the frame 90 may be straight prior to final assembly.

Final assembly is achieved with the aid of a clamping ring 106, best illustrated in FIG. 5 and which is engaged on and about said lower end portions of the frame 90. With the clamping ring 106 tightly engaged the said lower end portions are bent inwardly beneath the flange 100 as illustrated and accidental or unintended upward displacement of the filter bag and the two frame members is prevented. Thus, the three elements comprising each filter bag assembly are mounted in assembled position on their respective inlet or mounting flanges in a single operation involving the positioning of a clamping ring thereabout.

Alternatively, and particularly when the FIGS. 9 and 10 cage construction is employed, the lower end of the cage may be disposed about the clamp with the latter engaging the bag directly. Engagement of the upper end of the cage with the top plate will of course prevent unintended or accidental upward cage movement.

From the foregoing, it will be apparent that an improved filter device has been provided wherein undesirable ballooning of filter bags is effectively avoided with the incorporation of a simple and yet highly effective wire mesh frame which may be constructed at economic advantage. Moreover, the assembly and final mounting of each filter bag unit including internal and external support means may be accomplished in a signal operation and in a convenient and efficient manner.

I claim:

1. Filter apparatus for internal precoat of filter bags, and for fluid flow respectively in an upward and downward direction for filtering fluid and providing backwash cleaning of said apparatus, said apparatus comprising an upright housing having sidewalls, a top cover with an outlet for filtered fluid located therein, a bottom cover with an inlet for fluid to be filtered located therein, a horizontally arranged bottom wall located in a lower portion of said housing and spaced above said bottom cover, circular openings located in said bottom wall with short tubular flange sections located at said openings and extending upwardly therefrom, vertically extending rod members constructed and arranged to define a vertical skeleton tube surrounding each of said tubular flange sections, a flexible tubular filter bag with a closed top, sidewalls, and an open bottom surrounding each of said skeleton tubes, the lower edge of the sidwall of each bag sealingly connected to the tubular flange section which it surrounds, perforate frame means surrounding the exterior surface of each of said filter bags with clamp means arranged at the lower edge thereof as fastening means connecting said exterior frame, said filter bag, and said skeleton tube to the exterior surface of its corresponding tubular flange, filter aid media supply means connected to said bottom cover inlet whereby it may be introduced to the interior of each of said filter bags by a pressurized source of fluid to be filtered, backwash means in fluid communication with said top cover outlet whereby backwash of said filter bags occurs in a direction from the exterior to the interior through their sidewalls with discharge of washed material through said bottom cover inlet opening.

2. Filter apparatus as set forth in claim 1 wherein said vertical skeleton tube also includes annular horizontal rings secured internally of said vertical rod members and in spaced relationship with the filter bag sidewall.

3. Filter apparatus as set forth in claim 1 wherein said tubular flanges define internal openings for the upflow of precoat fluid which are of substantially lesser diameter than that of the filter bags.

4. Filter apparatus as set forth in claim 3 wherein said flange opening diameters are approximately one half the bag diameter.

5. A filter apparatus as set forth in claim 1 wherein said perforate frame means takes the form of an upstanding skeletal frame having a tubular configuration and being disposed closely about said filter bag.

6. A filter apparatus as set forth in claim 5 wherein said skeletal frame takes the form of a wire mesh having a small generally rectangular openings with a maximum dimension no greater than 2 inches.

7. A filter apparatus as set forth in claim 6 wherein said mesh openings are approximately one-quarter inch square.

8. A filter apparatus as set forth in claim 6 wherein said wire mesh is of stainless steel construction.

9. A filter apparatus as set forth in claim 1 wherein each of said tubular flanges has an annular generally horizontally outwardly projecting flange at an upper end portion thereof, and wherein each said horizontal flange has a plurality of circumaxially spaced outwardly open notches therein, said notches respectively receiving said vertical rod members and said members extending vertically beneath said horizontal flange, the aforesaid clamp means also being disposed beneath said flange.

10. A filter apparatus as set forth in claim 10 wherein each lower end portion of each of said perforate frame means and filter bags is bent generally radially inwardly beneath its associated horizontal flange by its associated clamp means, the latter being disposed externally of the said frame means, and the assembled elements thus being secured against unintended vertical upward displacement relative to the associated flange.

11. A filter apparatus as set forth in claim 10 wherein each filter bag has an annular enlargement at its lower end portion, said enlargement being disposed beneath the associated clamp means to secure the bag against unintended upward displacement.

* * * * *